United States Patent [19]

Sherwin

[11] Patent Number: 5,390,944
[45] Date of Patent: Feb. 21, 1995

[54] GARDEN IMPLEMENT AND SUPPLY CARRIER AND ORGANIZER

[76] Inventor: William C. Sherwin, 926 E. 800 South, St. George, Utah 84770

[21] Appl. No.: 51,400

[22] Filed: Apr. 23, 1993

[51] Int. Cl.⁶ ............................................. B62B 3/10
[52] U.S. Cl. .................... 280/47.35; 280/79.6; 248/129; 211/70.6; D34/5
[58] Field of Search ............... 280/47.35, 79.2, 79.5, 280/79.6, 47.19, 47.26; 206/443, 486; 220/505, 904; 211/62, 65, 70.6, 70.8; 248/111, 128, 129, 145.6; D34/5, 6, 21, 22, 23

[56] References Cited

U.S. PATENT DOCUMENTS

| | | | |
|---|---|---|---|
| 118,451 | 8/1871 | Harris | 211/70.6 |
| D. 189,908 | 3/1961 | Rhoads | D34/22 |
| D. 196,836 | 11/1963 | Berger | D34/21 |
| D. 217,714 | 6/1970 | Sakgiver | D34/21 |
| D. 280,859 | 10/1985 | Ott | D34/25 |
| 1,228,261 | 5/1917 | Taylor | 211/65 |
| 1,662,091 | 3/1928 | Vuozzo | 248/129 X |
| 2,543,697 | 2/1951 | Lanter | 280/79.2 |
| 2,596,749 | 5/1952 | Webber | 280/47.35 X |
| 3,145,031 | 8/1964 | Wilkinson | 280/47.35 |
| 3,172,681 | 3/1965 | Moses | 280/47.19 |
| 3,176,662 | 4/1965 | Williams | 211/69.5 |
| 3,550,999 | 12/1970 | Bogan | 280/47.19 |
| 3,731,333 | 5/1973 | Davis | 211/65 X |
| 3,759,538 | 9/1973 | Fabiano | 280/47.35 |
| 3,883,150 | 5/1975 | Varela | 280/47.19 |
| 4,311,262 | 1/1982 | Morin | 206/443 X |
| 4,350,366 | 9/1982 | Helms | 280/47.26 X |
| 4,947,998 | 8/1990 | Smeller | 211/70.6 |
| 5,092,463 | 3/1992 | Dees | 211/70.6 X |

FOREIGN PATENT DOCUMENTS

| | | | |
|---|---|---|---|
| 74526 | 8/1952 | Denmark | 211/69.5 |
| 1511474 | 11/1969 | Germany | 211/69.5 |

Primary Examiner—Brian L. Johnson
Attorney, Agent, or Firm—A. Ray Osburn

[57] ABSTRACT

An implement carrier and organizer is provided, including a hollow body with a top closure from which are suspended upwardly opening wells for storage of tools inverted with the handles downward within such wells. Both deeper wells for long handled tools, and more shallow welts for short handled tools, are provided. Casters are attached to the bottom of the carrier and organizer so that it may be easily trundled from one place to another, and rotated when in cramped storage space areas for easy access to particular tools.

13 Claims, 4 Drawing Sheets

GARDEN IMPLEMENT AND SUPPLY CARRIER AND ORGANIZER

BACKGROUND OF THE INVENTION

1. Field

The field of the invention is tool organizers for use in and about residences. More particularly, the invention relates to an improved implement and supply organizer which may be used for both storage and transport of garden and lawn care tools and accessories.

2. State of the Art

Tool and implement organizers have been widely proposed for long handled implements such as rakes, shovels and brooms. Some, as disclosed in U.S. Pat. No. 3,298,532, provide for inverted vertical storage of these implements with handles downward and tool heads upward. The elongate handles are inserted downwardly through openings through lids provided upon large pail-shaped containers such as trash cans. The handle ends are wedged between the walls of the can and a dome shaped structure installed in its bottom. Or, cup shaped compartments may be provided in the bottom to accept the inverted ends of the handles. A similar arrangement is disclosed in U.S. Pat. No. 4,947,998. A molded, handle-stablizing, member with numerous downwardly cupped handle accepting depressions is, again, installed in the bottom of the container. These prior art devices do not accommodate implements without elongate handles. They are also basically immobile when laden with tools, being too heavy to be easily carried, and also quite prone to toppling. When the tool laden storage devices are placed in areas of limited space, retrieval of individual implements is hampered because the devices cannot be easily rotated to place the wanted tool at hand.

U.S. Pat. No. 3,759,538 discloses a trolley-like tool organizer with four wheels. Although somewhat mobile, such devices lack sufficient compactness and maneuverability to facilitate indoor storage use in limited space areas. U.S. Pat. No. 2,596,749 discloses a device for storage of mops, brooms and buckets in upright positions. This device also has casters which provide desirable maneuverability. However, only a limited number of implements may be accommodated. Some implement carriers resemble golf carts, having a single pair of parallel, spaced apart wheels. See U.S. Pat. Nos. 2,778,654 and 2,835,503. Prop members are provided to immobilize these devices in desired locations. Again, maneuverability and compactness are undesirably limited. None of the prior art appears to provide for short handled tools, or tools having a pair of, rather than a single, handle, nor for miscellaneous supplies.

A need remains for a compact, maneuverable, tool and supply organizer which enables storage of a complete range of size, configuration and type of tools.

BRIEF SUMMARY OF THE INVENTION

With the foregoing in mind, the present invention eliminates or substantially alleviates the foregoing disadvantages of prior art implement organizing and storage devices. The inventive device comprises a cylindrical hollow body with an open bottom and a top closure from which a plurality of open top, closed bottom, wells are suspended, to accept the normally uppermost ends of elongate handles of implements inverted for storage or transport to the work site. Casters secured to the bottom of the body provide easy mobility for the laden device in all directions, including rotational, for ready individual tool access even in crowded storage locations. The casters are preferably mounted outwardly from the body to increase carrier stability. A brake is provided on one or more of the casters to immobilize the carrier when desired.

Because the top ends of the handles are of small diameter, a great number of implements may be accommodated using a relatively small carrier body. Deeper wells for longer handled shovels, brooms and the like are arranged near the outside wall concentrically with the vertical centerline of the body, providing clearance between the elevated working heads. Clearance may be further assured by installing the deeper wells at a slight angle upwardly and outwardly from the vertical. The wells ensure that each of the long handled implements is stored nearly vertical, so that two or more cannot lean together to cause toppling of the carrier. Because the carrier is basically stable, it may be low in height, advantageous for implement removal in low ceilinged storage areas.

For trowels or other short handled implements, a group of shallower wells is provided near to the body center. A rectangular well across the center of the body closure member is used for laundry bags and seed packages, for example. Preferably, one or more pockets external to the body accommodate implements, such as pruning shears, which have a pair of equal length handles. A handle on the exterior of the body is also advantageous.

It is therefore the principal object of the invention to provide a compact, lightweight tool organizer and carrier which accommodates a large number and variety of long, short and double-handled tools, which is highly mobile, highly stable against toppling, and is characterized as providing ready access to individual tools.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
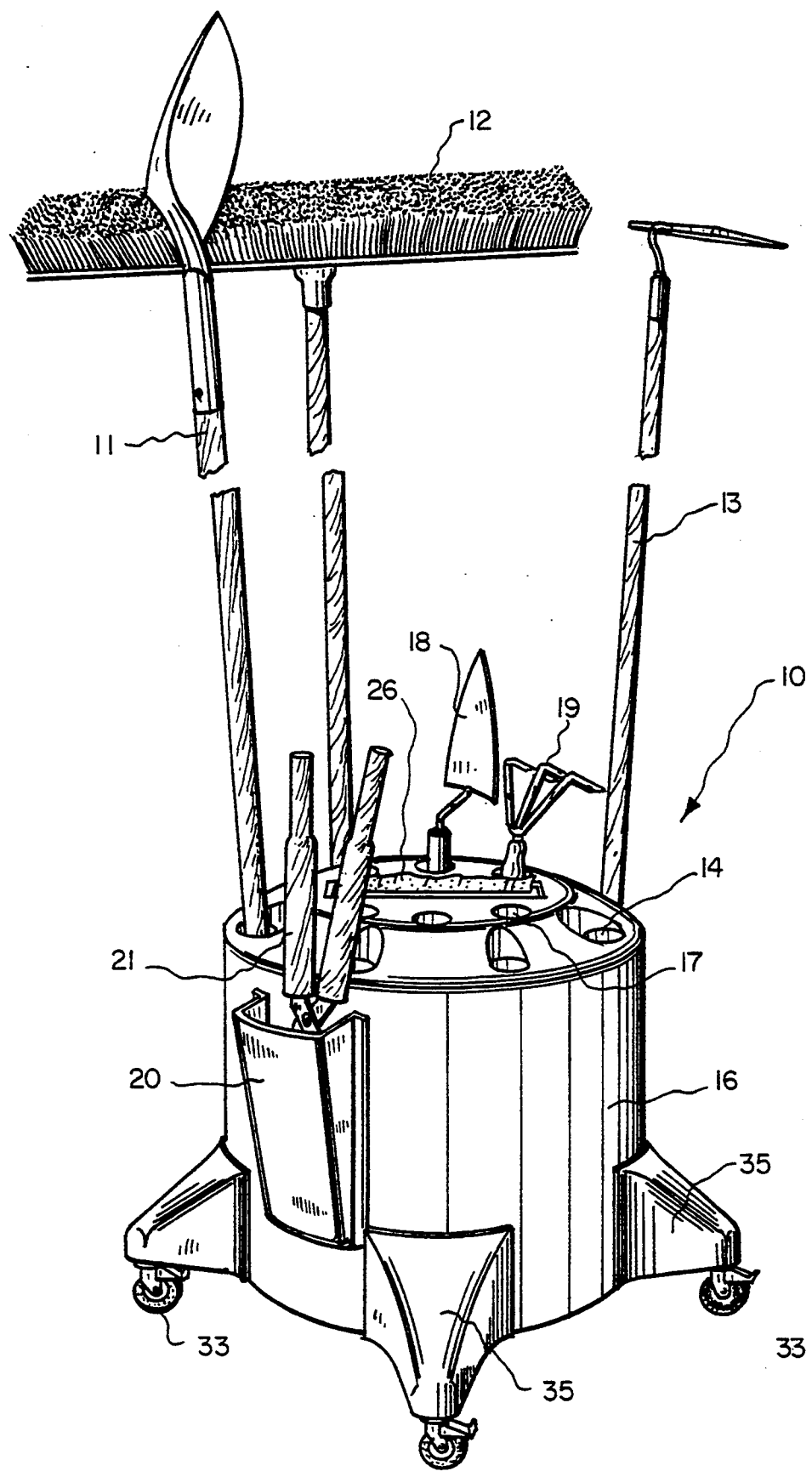
FIG. 1 is a perspective view of an implement carrier and organizer in accordance with the invention, shown laden with implements, drawn to a reduced scale, FIG. 2 a top plan view of the carrier and organizer of FIG. 1, drawn to the same scale, FIG. 3 a front elevation view of the carrier and organizer of FIG. 1, drawn to the same scale, FIG. 4 a vertical cross sectional view of the carrier and organizer of FIG. 2, taken along line 4—4 thereof, drawn to the same scale, FIG. 5 a bottom view of a fragment of the carrier and organizer of FIG. 3, showing the caster mount, drawn to substantially full scale, FIG. 6 a cross sectional view of a fragment of the carrier and organizer of FIG. 2, taken along line 6—6 thereof, drawn to an enlarged scale, FIG. 7 a vertical sectional view of a fragment of the carrier and organizer of FIG. 2, taken along line 7—7 thereof, drawn to the scale of FIG. 6, FIG. 8 a vertical sectional view of a fragment of the carrier and organizer of FIG. 2, taken along line 8—8 thereof, drawn to the scale of FIG. 7, and FIG. 9 a side elevation view of a typical caster as shown in FIG. 1, drawn to substantially full scale.
Figure 2:
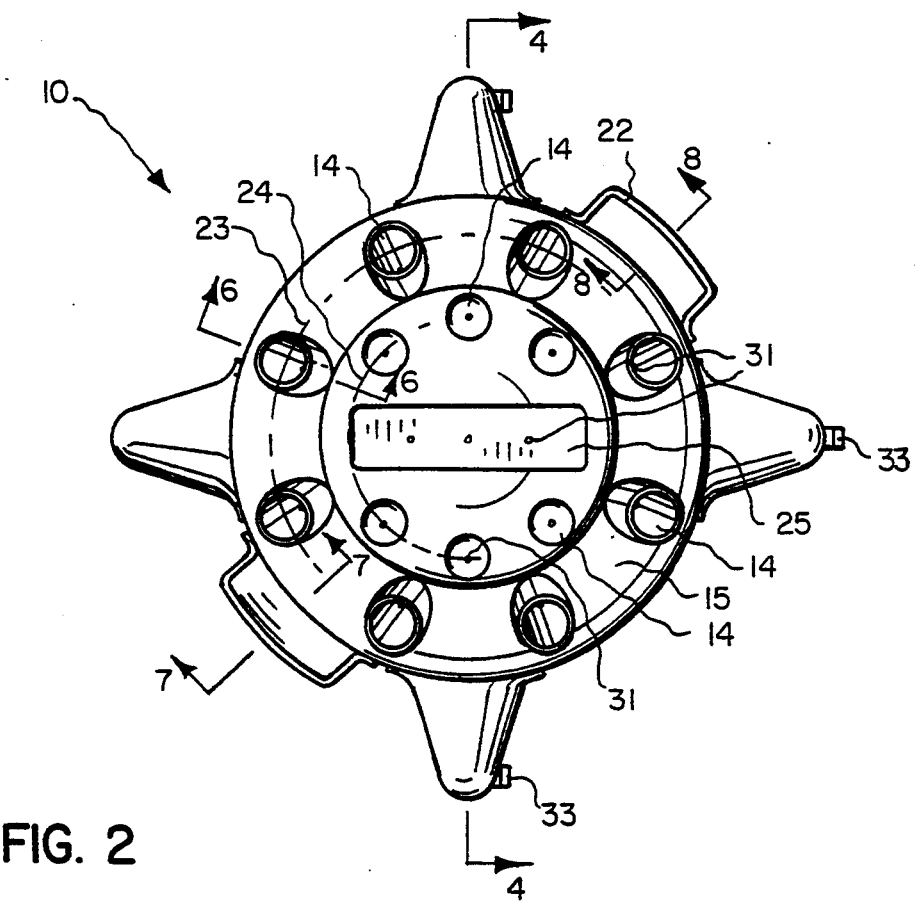
Figure 3:
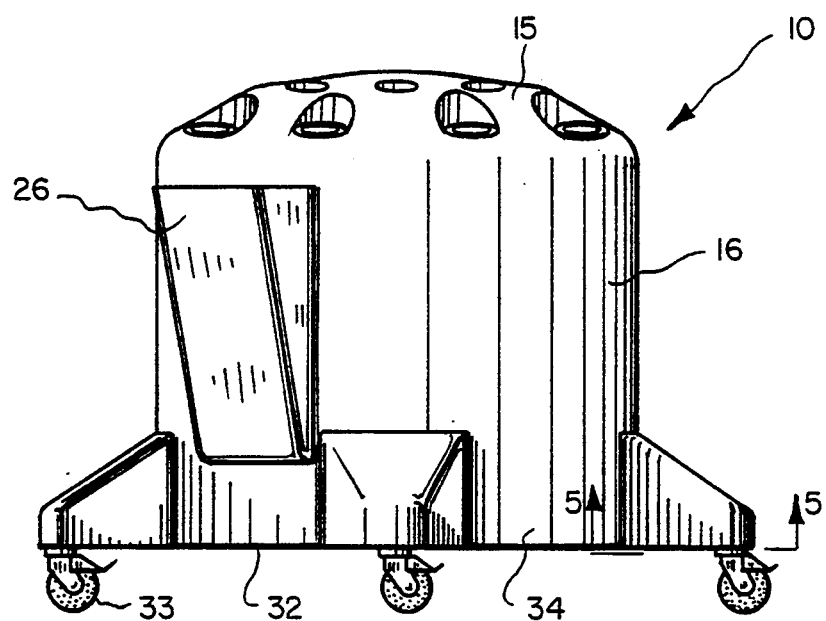
Figure 4:
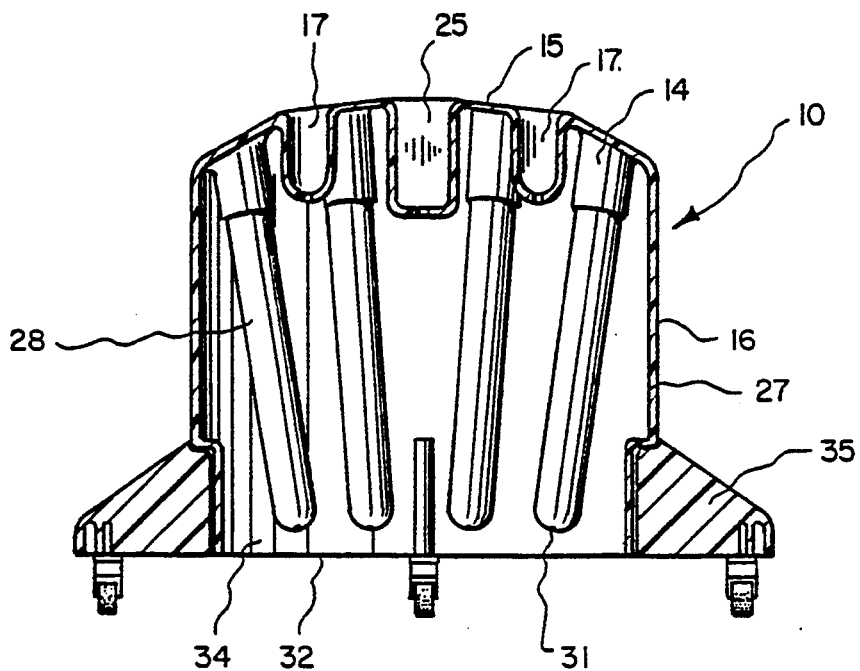

An implement storing, carrying and organizing device 10 in accordance with the invention is shown in use in FIG. 1, laden with both long and short handled implements for transport or storage. A spade 11, a janitor's broom 12 and a hoe 13 each protrudes inverted from one of eight deepest handle wells 14 opening upwardly through a dome-shaped cover or closing member 15 of carrier body 16. See also FIGS. 2, 4 and 6. Many additional long handled implements for two-handled, erect body use, not shown, could also be carried along with the illustrated tools, including a house broom, a leaf rake, a longhandled rotary mulching tool, a shovel, and a soil rake, totaling up to eight of such tools.

Six wells 17 accommodate shorter handled tools, including the garden trowel 18 and short handled scrapermulcher 19 shown in FIG. 1. Finally, a pouch 20 bonded to the exterior of the body 16 advantageously provides for tools such as brush shears 21 having a pair of handles rather than a single handle. The working heads of such tools are inserted downwardly into pouch 20. A handle loop 22 (FIG. 2) secured as by bonding is also advantageous for moving carrier 10.

Figure 6:
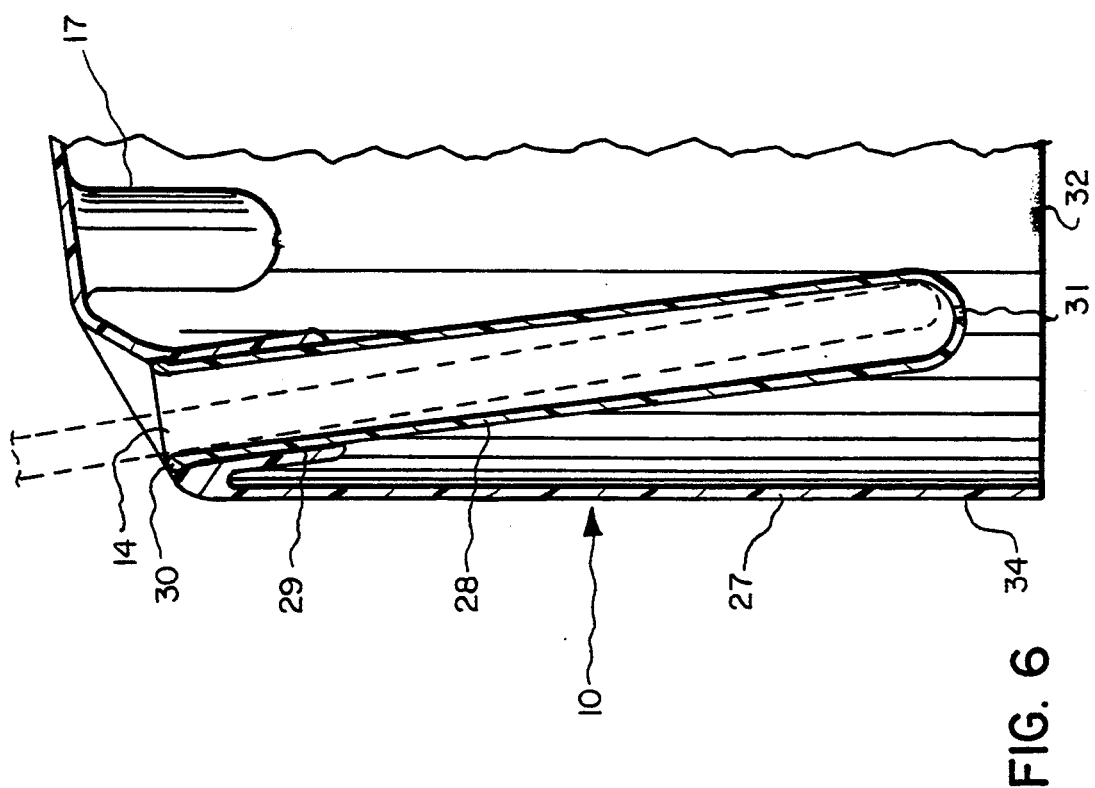

The deep wells 14 for long handled implements are evenly spaced about a circle 23 which is concentric with the center of body shell 16. (FIGS. 2, 3, 4 and 6) This arrangement provides maximum clearance between the working heads of the implements, which are elevated into the air at the end of the handles while being stored or carried. Further clearance space between elevated working heads is provided by the varying lengths of the implement handles. As seen in FIG. 6, the deep wells 14 may be constructed to angle outwardly to provide further clearance. The shallow wells 17 are spaced along a circle 24 inside deep wells 14, utilizing the space inside the long handles. A rectangular well 25 for supplies and accessories utilizes part of the central space, carrying, for example, a package 26 of trash disposal bags.

Carrier body 16 comprises am open bottom cylindrical shell 27 closed by an integrally molded dome 15 from which the aforementioned wells are suspended. (FIGS. 4 and 6) The shallow wells 17 and 25 are molded integrally with dome 15. Deep wells 14 comprise elongate molded well tubes 28 secured as by bonding, not shown, within well stubs 29, the latter molded integrally with dome 15. Advantageously, an outward extending lip 30 on each well tube 28 prevents its downward dislodgment by weight of the implement or impact from its handle when placed therein. Each of the wells 14, 17 and 25 are provided with one or more drain holes 31, directing water from rain or other sources through open bottom 32 to the ground. This prevents inadvertent deterioration of wooden implement handles by water soaking, for example.

Figure 5:
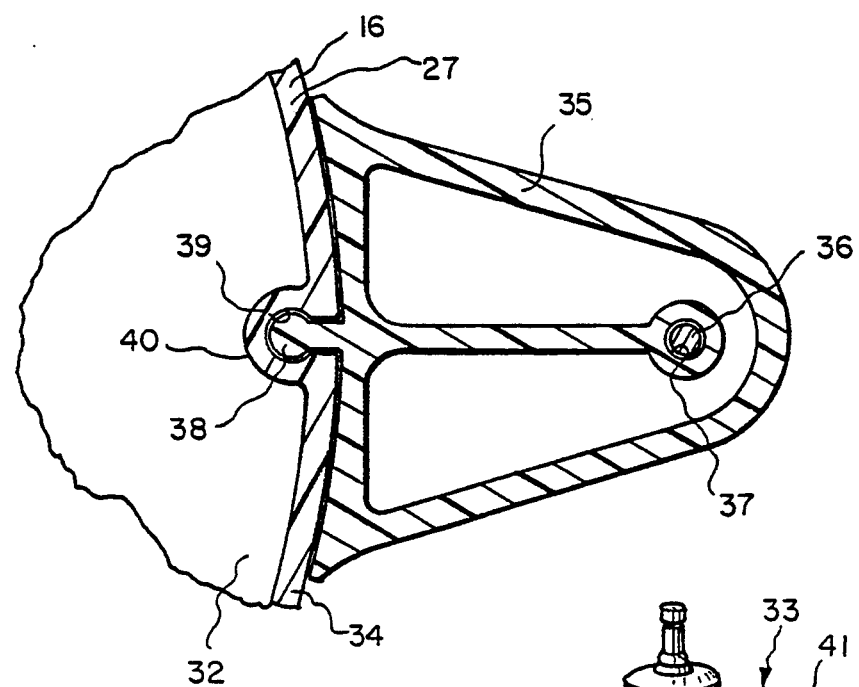
Figure 9:
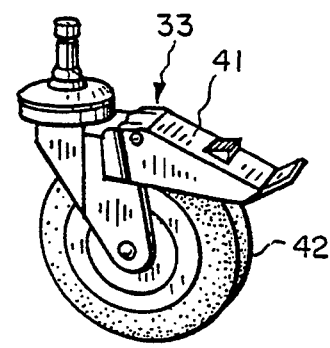
Figure 8:
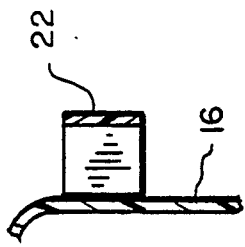
Figure 7:
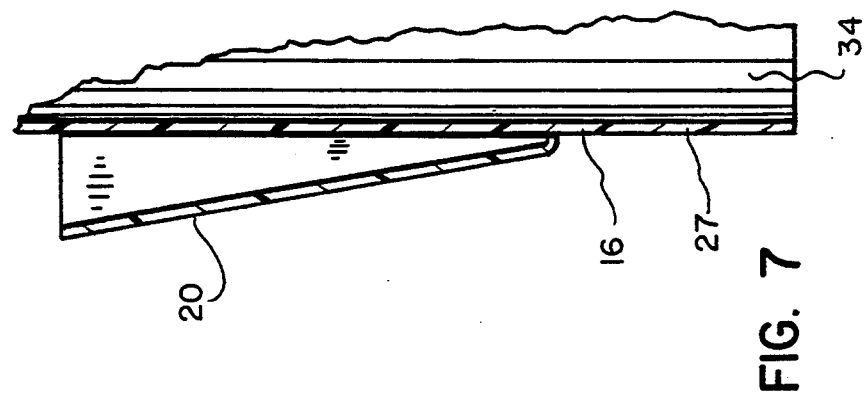

A multiplicity of swivel casters 33 render carrier 10 mobile and maneuverable. Casters 33 are secured to the bottom 34 of body shell 27 through preferably detachable mounts 35. (FIGS. 4 and 5) Each caster 33 comprises a mounting stem 36 inserted into a vertical stem socket 37 in a corresponding caster mount 35. A knob 38 on each caster mount 35 mates with a vertical female slot 39 carried by an inward projection 40 from body wall 27, securing mount 35 to skirt 34. Preferably, at least one caster 33, such as shown in FIG. 9, incorporates a brake lever 41 which immobilizes wheel 42, placing it into a fixed, non-rolling non-swivelling position, preventing carrier 10 from unwanted coasting while unattended.

Caster mounts 35 extend substantially outward from skirt 34 to provide a wide base for carrier 10. This prevents toppling of carrier 10 without using heavy and expensive ballast material. When substantially laden with tools, the distributed weight of the tools is sufficiently balanced against overturning. When lightly laden, the weight of carrier 10 counterbalances the weight of the tools. The well tubes 28 position each implement independently, so that the weight of each working head is located substantially directly above its corresponding well 14. This prevents the implements from being carelessly loaded to lean together in a common direction to topple carrier 10. Such toppling is possible with many prior art devices.

The stability against toppling provided by the protruding caster mounts 35 and the vertically carried implements permits carrier 10 to be built with reduced height. This eliminates interference with removal or insertion of long handled tools from or into the carrier 10 when it is utilized in low ceiling garage storage areas, for example. Many garages have ceiling or roof structures too low for interference-free removal of such tools from the taller prior art devices. Carrier 10 may be designed to have a total height of less than 19" without sacrifice of stability. This allows for a body height of about 16". A corresponding depth of over 13" may then be utilized for each well 14. The wells may then be sized to very loosely accept the handle ends, while perventing excessive tilting of the tools, and effectively resisting such tilting by low, widely spaced coupling forces.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. A storage and organizing device for accommodating a wide range of garden and lawn care implements, accessories and supplies, including implements each comprising an elongate generally cylindrical handle member each connected at one end thereof to a working head, said device having:

a generally hollow body with a vertically upstanding wall structure having an uppermost and a lowermost extension, said uppermost extension being spanned horizontally by a closing member;

a multiplicity of elongate, tubular wells each having an uppermost and a lowermost end, each supported only by connection of the uppermost end thereof to the closing member, to pend downwardly therefrom, the lowermost end thereof terminating in a well closing member thereacross integral therewith, each well being sized in cross section and in depth to loosely accept an end portion of a handle member of one of the implements, said implement being supported with the end of the handle thereof resting upon the well closing member and with the implement working head uppermost and above the well; and at least one of the tubular wells accepts and supports a long handled implement and is suspended from the closing member at an angle upwardly and outwardly from the center of the body.

2. The storage and organizing device of claim 1, further comprising:
roller means secured to the lowermost extension of the hollow body permitting unlimited horizontal translation and rotation of the device.

3. The storage and organizing device of claim 2, wherein:
the roller means comprises casters.

4. The storage and organizing device of claim 3, wherein the implements include long handled tools for two-handed use and short handled tools for one-handed use, and the handle accepting wells include:
wells for accepting and supporting the long handled implements; and
wells for accepting and supporting only the short handled implements.

5. The storage and organizing device of claim 4, further comprising:
a generally rectangular well opening upwardly through and suspending downwardly from the closing member for storage of miscellaneous accessories; and
implement support means carried externally upon the vertically upstanding wall structure, said support means being sized and shaped to accept and support tools having two paired handles.

6. The storage and organizing device of claim 5, wherein:
the implement support means comprises at least one pouch sized and shaped to accept the working heads of tools having two paired handles downwardly thereinto.

7. The storage and organizing device of claim 4, wherein:
the hollow body comprises a shell structure integrally molded with the closing member and terminating in a substantially open bottom.

8. The storage and organizing device of claim 4, wherein:
the casters are mounted upon structures each having a knob disposed to engage a vertical groove; and
the hollow body carries vertical grooves each engaged by one of the mounting structure knobs.

9. The storage and organizing device of claim 7, wherein:
the casters are mounted upon structures each having a knob disposed to engage a vertical groove; and
the hollow body carries vertical grooves each engaged by one of the mounting structure knobs.

10. The storage and organizing device of claim 4, wherein:
the total height of the device does not exceed 19"; and
the depth of the long handled implement wells is at least 13".

11. The storage and organizing device of claim 4, wherein:
the long handled implement wells are suspended vertically from the closing member.

12. The storage and organizing device of claim 4, wherein:
the long handled implement wells are suspended from the closing member at an angle upwardly and outwardly from the vertical direction.

13. The storage and organizing device of claim 8, wherein:
the long handled implement wells are suspended from the closing member at an angle upwardly and outwardly from the vertical direction.

* * * * *